United States Patent [19]

Logan

[11] Patent Number: 4,781,143
[45] Date of Patent: Nov. 1, 1988

[54] TRAILABLE VEHICLE PONTOON SYSTEM

[76] Inventor: Kenneth C. Logan, P.O. Box 48168 Bentall Center, Vancouver, B.C., Canada, V7X 1N8

[21] Appl. No.: 15,778

[22] Filed: Feb. 17, 1987

[51] Int. Cl.[4] .............................................. B63B 7/00
[52] U.S. Cl. .................................. 114/353; 114/344; 114/282; 114/292
[58] Field of Search ............... 114/343, 344, 352, 353, 114/354, 268, 271, 274, 280, 292, 282–285, 61, 269

[56] References Cited

U.S. PATENT DOCUMENTS

| | | | |
|---|---|---|---|
| 1,692,208 | 11/1928 | Hallock | 114/353 |
| 3,061,845 | 11/1962 | Gerbracht | 114/353 |
| 3,083,382 | 4/1963 | Havens | 114/353 |
| 3,115,860 | 12/1963 | Payne | 114/292 |
| 3,121,238 | 2/1964 | Levinson | 114/353 |
| 3,456,611 | 7/1969 | Johnson | 114/282 |
| 3,670,684 | 6/1972 | Helker | 114/283 |
| 3,807,338 | 4/1974 | Shader | 114/292 |
| 3,940,813 | 3/1976 | Konstantinov | 114/353 |
| 4,522,143 | 6/1985 | Holzbaur | 114/353 |
| 4,685,641 | 8/1987 | Tirsch | 114/282 |

FOREIGN PATENT DOCUMENTS 3046098 7/1982 Fed. Rep. of Germany ...... 114/268

Primary Examiner—Joseph F. Peters, Jr.
Assistant Examiner—Clifford T. Bartz

[57] ABSTRACT

A trailable pontoon system that may be pulled behind a road vehicle and that may facilitate the launch of said road vehicle to effect a waterborne configuration comprised of the pontoon system and the vehicle. The trailable pontoons are capable of being unfolded by means of a rotating winch bar and are capable of separation to permit the vehicle to enter between the pontoons and be lifted into a mounted configuration upon the pontoons utilizing aforesaid winch bar. The launch and retrieval procedures utilize a combination of the pontoon's floatation capability, the vehicle's structural integrity, drive train and braking system and the facilitative function of the rotating winch bar. The vehicle/pontoon configuration, when waterborne, is a hybrid of the vehicle's inherent structural integrity and the floatation capability of the pontoons.

4 Claims, 7 Drawing Sheets

TRAILABLE VEHICLE PONTOON SYSTEM

The present invention relates to a set of trailable pontoons for the conversion of vehicles into houseboats, waterborn vessels and the like.

There are occasions when it would be advantageous for a vehicle to become waterborn or to be able to traverse a body of water where there is neither bridge nor ferry readily available. Furthermore, with the development, in recent years, of recreational vehicles such as motorhomes featuring all the amenities of modern home living, it would be advantageous to open up the waterborn dimension for the owners of such vehicles.

Heretofore, a number of attempts have been made to provide waterborn operation for vehicles but these have been restricted to floating vehicles such as military amphibious craft or designs that are boats with wheels for land operation. Also, floating platforms are available onto which recreational vehicles may be driven however such platforms are not readily transportable on land and hence restrict the availability of such waterborn transport to areas where such platforms are available.

In order to overcome this lack of a universal conversion system to convert virtually any vehicle into a waterborn vessel, the present invention provides a unique trailable pontoon system that can be unfolded to provide a suitable floatation system for various types and sizes of vehicles.

Accordingly, it is an object of the present invention to provide an economical trailable pontoon system that can be readily unfolded or assembled to accommodate a vehicle. It is another object of the present invention to provide a pontoon system that can be readily configured and the vehicle loaded with a minimum of effort. It is still a further object of the present invention to provide a means of launching a vehicle upon the pontoon system from either launch ramp, dock, beach or river bank.

In the specification and the accompanying drawings, some preferred embodiments of the present invention in a trailable pontoon system are shown and described. It is to be understood that these disclosed embodiments are not intended to be exhaustive nor a limitation of the invention, but, on the contrary, they are shown for the purpose of illustration in order that others skilled in the art may fully understand the invention, its principles and the manner of carrying it out.

Figure 1:
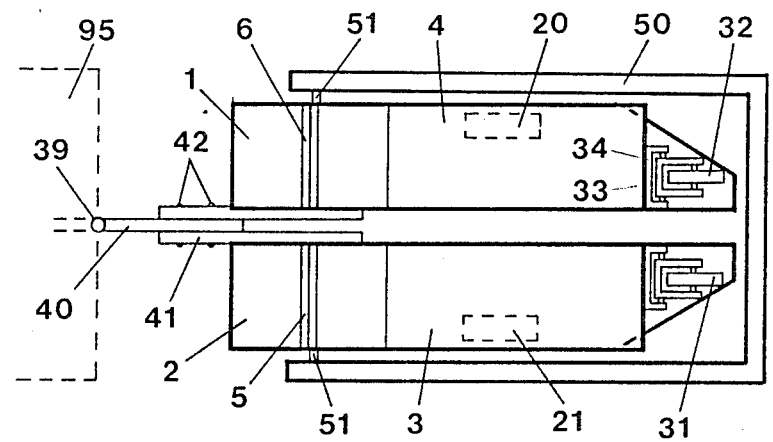
FIG. 1 is a schematic plan view showing the pontoons in the folded trailerable configuration.
Figure 2:
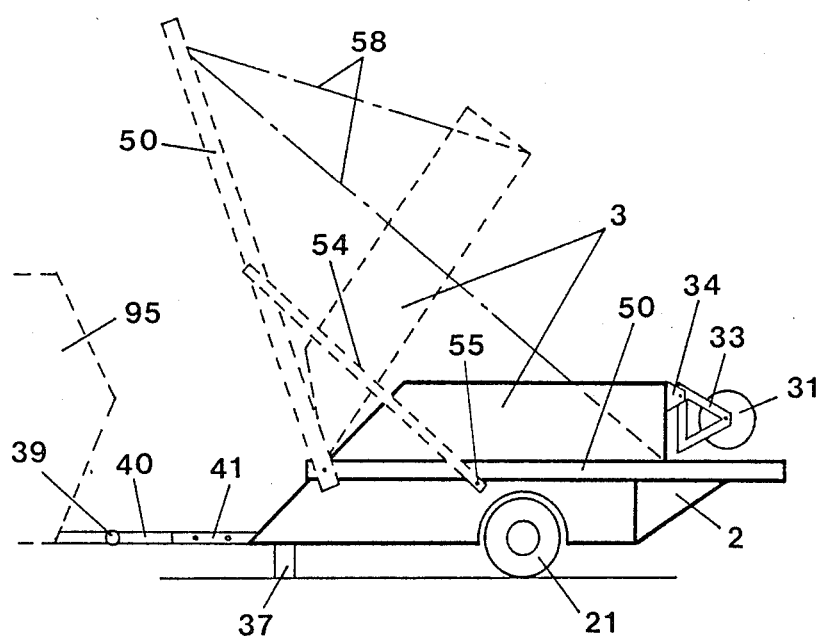
FIG. 2 is a side elevation of the pontoons in the folded trailerable configuration.
Figure 3:
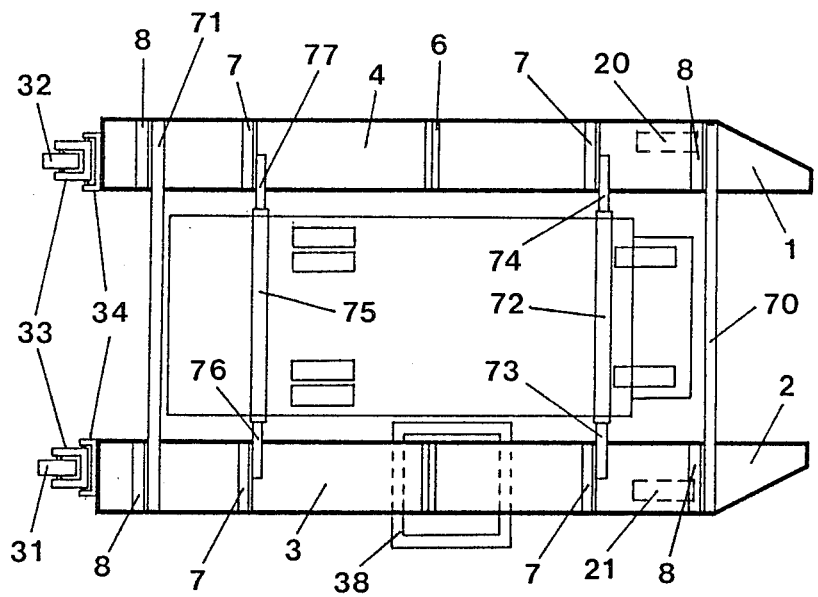
FIG. 3 is a plan view showing the pontoons extended and separated to accommodate a vehicle in the waterborn configuration.

Referring to the drawings, and to FIGS. 1 through 6 in particular, a trailable pontoon system suitable for launching vehicles is shown. The system is comprised of a forward port pontoon 1 connected to an aft port pontoon 4 by a hinge 6 and a forward starboard pontoon 2 connected to an aft starboard pontoon 3 by a hinge 5. A rotating winch frame 50 comprised of an extension 52, a block and tackle 57 and a gear reduced winch 53 is free to rotate about the winch frame bearings 51 (located on both the inboard and outboard sides of the forward pontoons 1 and 2).

In order to commence the launch process, hand blocks 37 are judiciously placed beneath pontoons 1 and 2 in order to retain the pontoons in a horizontal configuration. The trailer hitch 39 is detached from the vehicle 95 whereafter the tongue bolts 42 are removed allowing the tongue 40 to separate from the tongue beams 41.

The winch frame 50 is rotated anti-clockwise through approximately 110 degrees (see FIG. 2) and secured by winch frame braces 54 attached to winch frame brace brackets 55 mounted on the forward pontoons. The winch cable 57 is attached to clips (not shown) near the aft end of the aft pontoons 3 and 4. Using the gear reduced winch 53 and block and tackle 57, the aft pontoons are rotated through 180 degrees whereupon the winch frame 50 is detached and a dolly 38 is placed under the balance point of the starboard pontoon set 2 and 3.

The starboard pontoon set 2 and 3 are rolled laterally away from the port pontoon set 1 and 4 until they are separated sufficiently to permit the forward cross beam 70 to be bolted to the cross beam brackets 8. The vehicle 95 is driven in between the port (1 and 4) and starboard (2 and 3) pontoon sets allowing the aft cross beam 71 to be bolted to the cross beam brackets 8.

Figure 6:
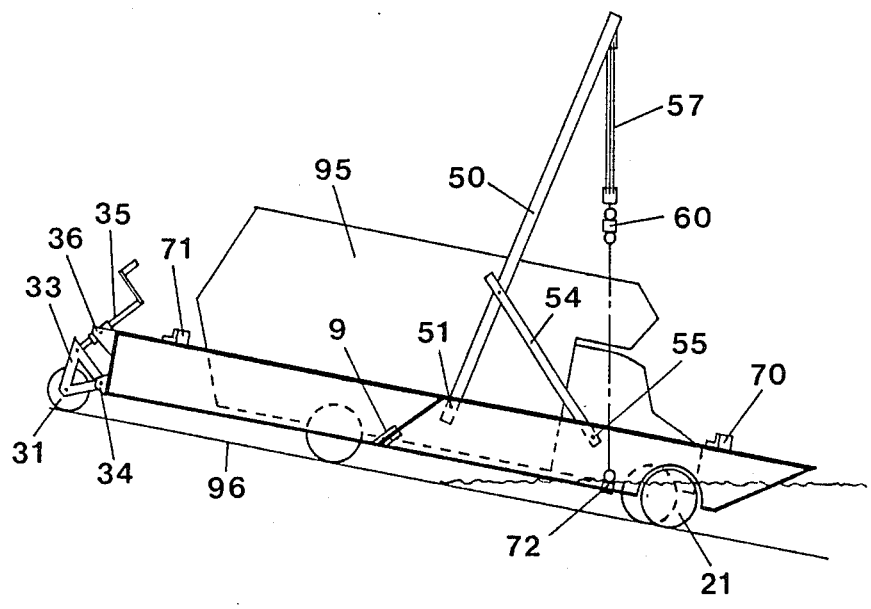
FIG. 6 is a side elevation with a vehicle shown at the commencement of the launching operation.

The pontoon hinge lock brackets 9 are bolted together and the aft pontoon wheels 31 and 32 together with frames 33 are lowered by rotating the frames 33 around their pivot bearings 34 using screw devices 35 which turn inside a spiral screw attached to a rotating bracket 36 (see FIG. 6). The winch frame insert 52 is installed and the winch frame 50 is attached to the inboard winch frame bearings 51 located on the forward pontoons 1 and 2. The winch frame is rotated anti-clockwise through approximately 80 degrees and secured by winch frame braces 54. The spreader bar 60 and suspension cables 61 are attached to the block and tackle 57 (see FIGS. 5 and 6). The system is now ready for launch.

The suspension cables 61 are attached to the forward vehicle cross beam 72 and the winch cable slack is taken up. The vehicle is allowed to roll slowly down the launch ramp 96 while the surrounding pontoon system accompanies it (bunted along by the vehicle nudging the forward cross beam 70). As the forward pontoons 1 and 2 begin to float, the winch cable slack in winched in forcing the trailer wheels 20 and 21 back down onto the ramp 96. Eventually, the forward pontoon displacement is sufficient to support the weight of the vehicle front end (see FIG. 7). The front end is winched up to a point where port 74 and starboard 73 sliding struts can be extended to rest upon port 12 and starboard 11 intermediate brackets respectively. With the forward sliding struts secured in place with bolts or other holding devices, the winch cable is slackened off and the winch frame braces 54 are detached from their brackets 55. The winch frame 50 is rotated anti-clockwise through approximately 60 degrees and secured by winch frame brace brackets 54 (see FIG. 8). The suspension cables 61 are attached to the aft vehicle cross beam 75. As the pontoon system continues down the ramp 96, the rear of the vehicle is winched up into a position allowing the port 77 and starboard 76 sliding struts to be extended and attached to the strut brackets 7.

Figure 7:
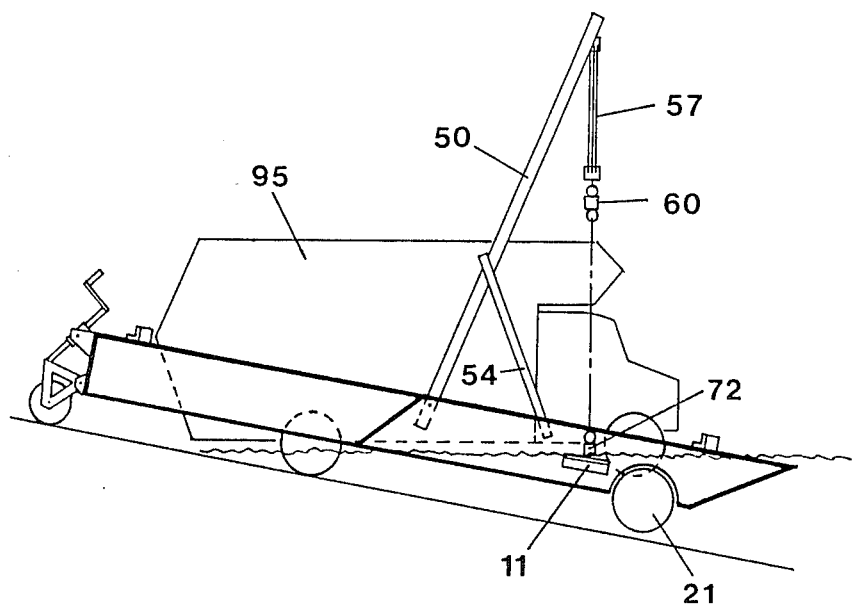
FIG. 7 is a side elevation with the front of the vehicle partially mounted.
Figure 8:
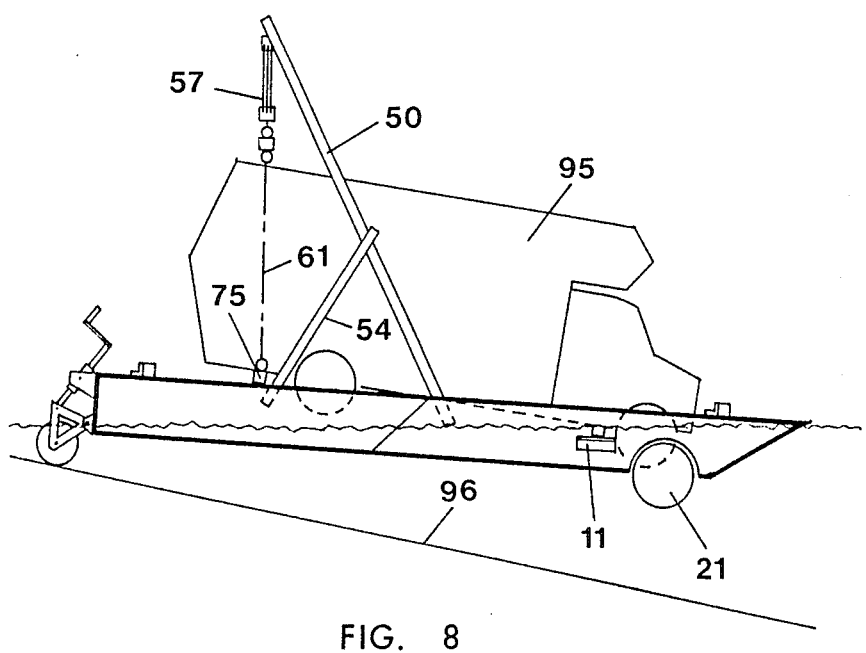
FIG. 8 is a side elevation with the front of the vehicle partially mounted and the rear of the vehicle fully mounted.

With the rear of the vehicle fully mounted, the winch frame 50 is rotated clockwise to the position indicated in FIG. 7 and the front of the vehicle is lifted to a position where the port 74 and starboard 73 sliding struts can be fully extended and attached to strut brackets 7. The vehicle is now fully waterborn.

Figure 9:
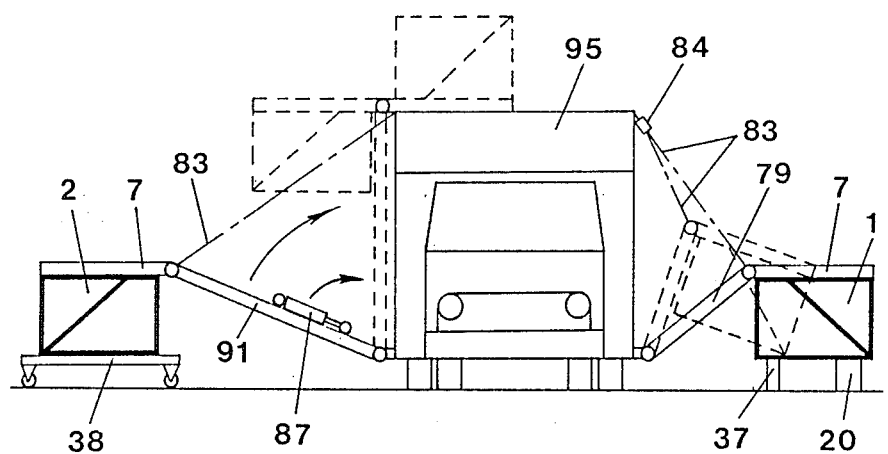
FIG. 9 is a front elevation showing a hydraulic extension system.
Figure 10:
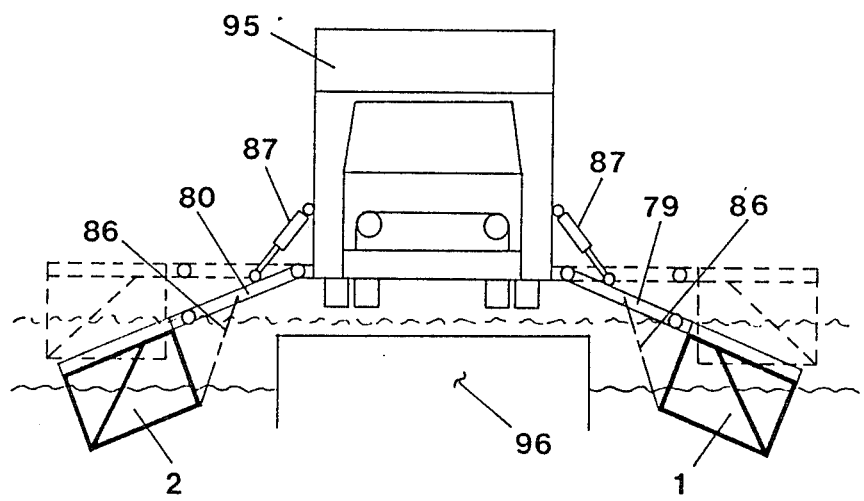
FIG. 10 is a front elevation showing a dock launching procedure.
Figure 11:
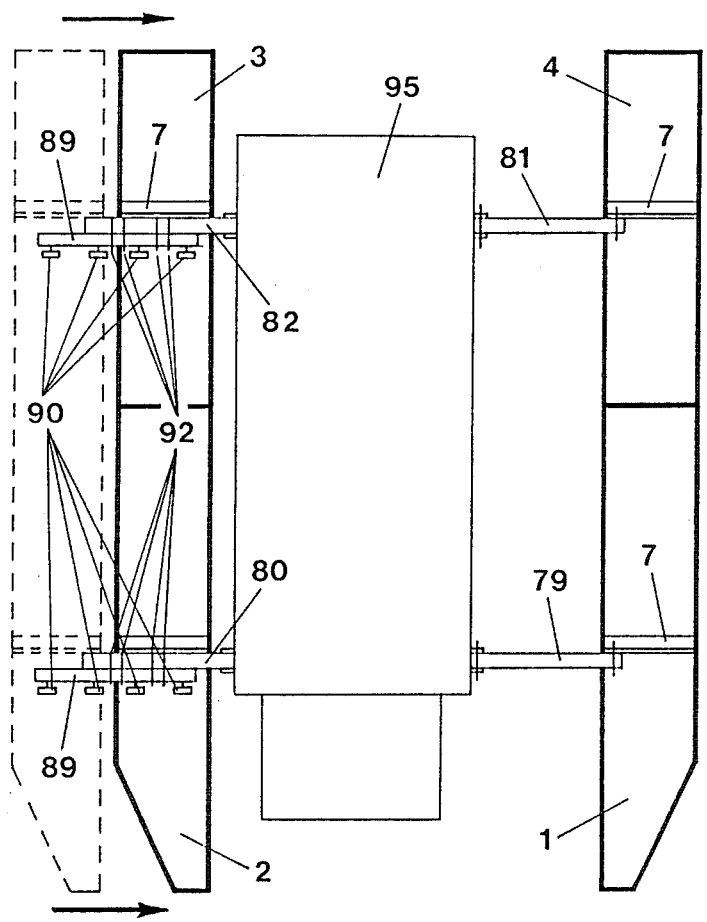
FIG. 11 is a plan view showing the pontoons in adjustable configurations.
Figure 12:
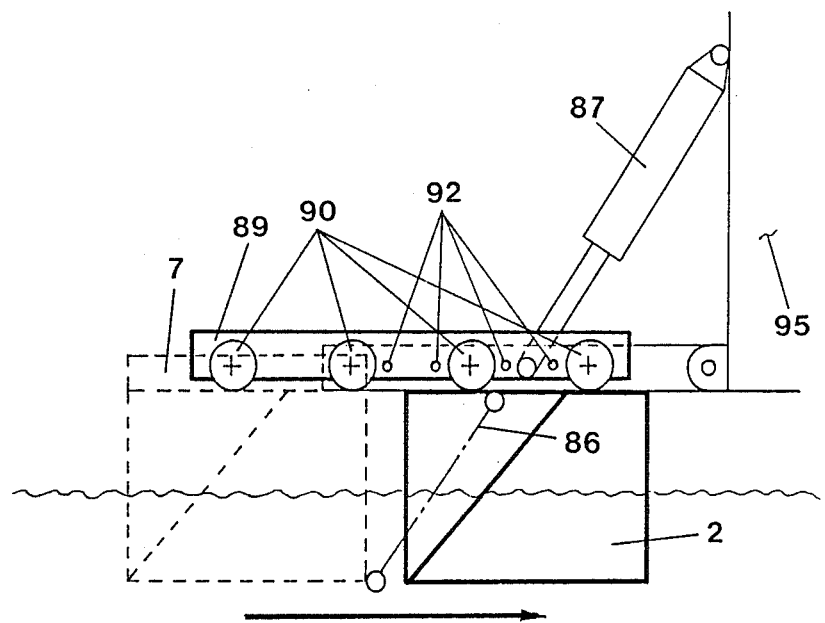
FIG. 12 is a detail showing a hydraulic sliding pontoon strut.

Referring to FIGS. 9 through 12, the pontoon struts are raised and lowered by hydraulic cylinders 87 and the system can be used to effect a launch off a level dock 96. In this alternate configuration, the pontoons are unfolded and spread apart as hereinabove described. However, rather than having port and starboard pontoon sets attached by fore and aft cross beams 70 and 71 respectively, hydraulic struts 79,80,81 and 82 are attached to the strut brackets 7. In this way, the pontoons may be lifted free of the ground for transport to a dock (see the right side of FIG. 9). The left side of FIG. 9 depicts a special case whereby elongated hydraulic struts 91 can be used to hoist the pontoon set atop the vehicle 95 for transport. In the hoisting operation, lifter cables 83 pass through a mid-vehicle pulley 84 and back to a rear mounted, gear reduced winch (not shown).

In order to effect a dock launch, the pontoons are hoisted off the ground as shown on the right side of FIG. 9. The vehicle may then be driven onto a dock 96 wide enough to accommodate the vehicle 95. The hydraulic cylinders 87 are then attached to the side of the vehicle and activated thus depressing the struts 79, 80, 81 and 82 thus depressing the pontoons into the water. Pontoon stay cables 86 prevent the pontoons from rotating up out of the water. With the pontoons sufficiently depressed, the vehicle will tend to lift free of the dock and can then be pushed out beyond the dock.

When the vehicle is clear of the dock, the hydraulic cylinders can be relieved permitting the vehicle to descend to a point whereby the hydraulic struts are horizontal. At this point, a pair of roller beams 89 (FIGS. 11 and 12) are bolted 92 to the hydraulic struts on one side of the vehicle. The struts are then detached from the strut brackets 7 and the pontoon set is allowed to roll inward toward the vehicle on a set of rollers 90. The strut brackets 7 are then re-attached to the pontoon set. The roller beams 89 may then be unbolted and attached to the hydraulic struts on the other side of the vehicle and the procedure repeated.

Figure 13:
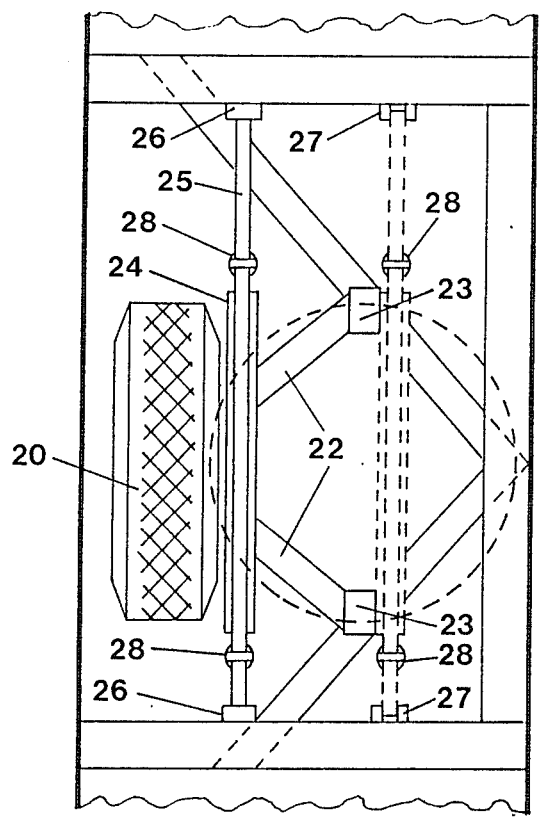
FIG. 13 is a plan view of a retractable trailer wheel.
Figure 14:
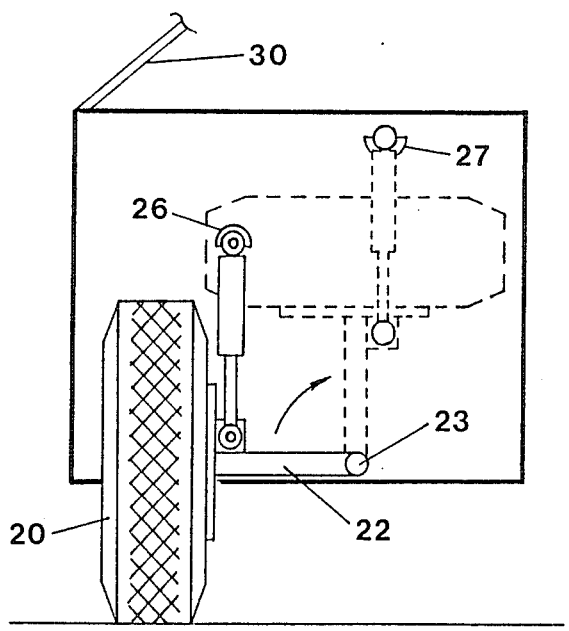
FIG. 14 is a front elevation of the retractable trailer wheel.

Once the vehicle/pontoon set is fully waterborn, it is desireable to retract the trailer wheels to reduce drag and prevent corrosion of the wheel bearings, brake linings etc.. FIGS. 13 and 14 depict a method of effecting wheel retraction. The wheel 20 is attached to a wheel suspension frame 22 which in turn rotates about suspension frame joints 23. In order to retract the wheel once waterborn, the wheel well access door 30 is lifted. The adjustable shock bar 25 may be depressed disengaging it from the lower shock bar brackets 26. The shock bar 25 may then be lifted thus pulling up the shock absorbers 28, the suspension frame shock absorber connection bar 24 and the entire wheel assembly. The ends of the shock bar 25 may then be inserted in the upper shock bar brackets 27 thus retaining the wheel in the retracted position.

Figure 4:
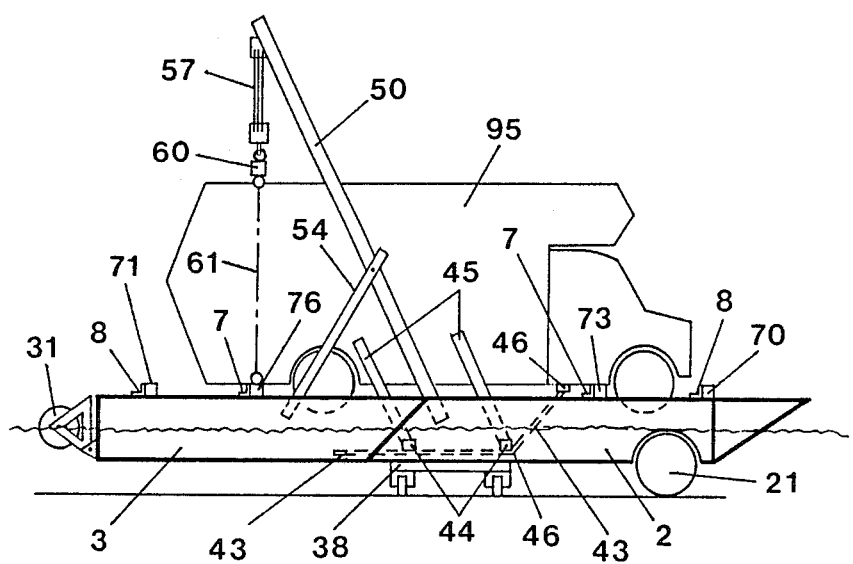
FIG. 4 is a side elevation showing a vehicle mounted in the waterborn configuration.
Figure 5:
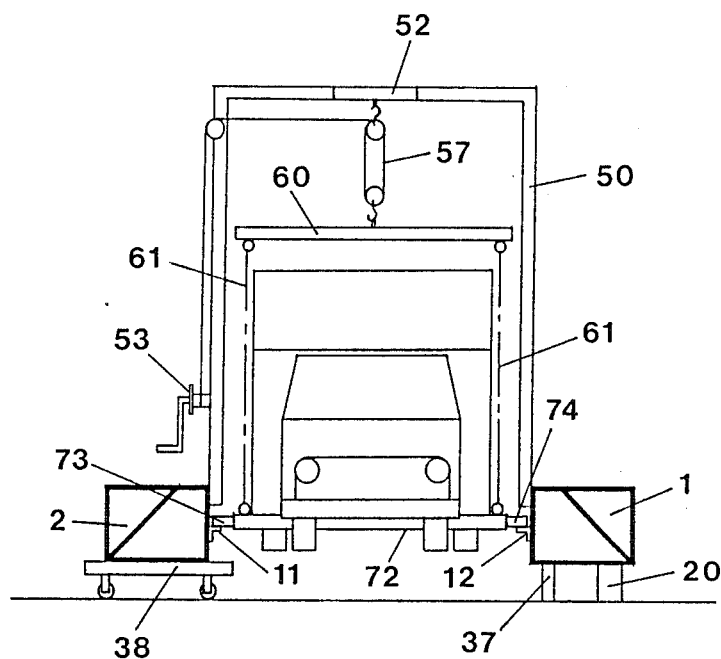
FIG. 5 is a front elevation showing a vehicle partially mounted.

Referring to FIG. 4, while in the road configuration, a folding hydrofoil grid 43 is mounted parallel to and flush with the underside of the vehicle 95. With the vehicle/pontoon system waterborn, and the trailer wheels 20 and 21 retracted, the folding hydrofoil grid 43 may be depressed by rotating on hinges 46 into the configuration shown in FIG. 4. The folding hydrofoil grid 43 is then held in this position by grid braces 45 and grid cross beams 44.

As the vehicle/pontoon system is driven forward through the water by a suitable power source (eg. an outboard motor) a vortex is created immediately behind the trailing edge of the hydrofoil grid 43. As the forward motion continues, the water above the hydrofoil grid 43 tends to drain off the trailing edge thus increasing the total system displacement. This in turn causes the system to rise slightly thus increasing speed and lengthening the vortex behind the trailing edge further increasing displacement. Ultimately, the vehicle/pontoon system rises to a point where it begins to hydroplane on the pontoons.

Other related aspects of a navigable pontoon system include such items as a drive system, a steering system and other such options as may be considered desirable however, such auxilliary items are beyond the scope of the present invention. While the present illustrated embodiments are for the purpose of setting forth illustrative examples of the present invention, it is to be understood that others will occur to those skilled in the art which are within the scope and spirit of the following claims.

I claim:

1. A vehicle launching system comprising, in combination, hinged pontoons, retractable wheel modules attached to said pontoons, a rotating winch frame, with cable and hook, attached to said pontoon hinges, extendable beams attached front and rear to the vehicle to be launched by and onto said vehicle launching system, removable cross beams capable of being attached to said pontoons said vehicle having a drive train and braking system, said vehicle launching system being adaptable to a procedure in which said hinged pontoons are capable of unfolding on said hinges facilitated by said winch frame and said pontoons being capable of being separated laterally to permit said vehicle to be driven between said separated pontoons, said rotating winch frame being adaptable to rotate toward the front of said vehicle and by means of a winch cable disposed to said vehicle, to lift the front of said vehicle to a postion where said front extendable beam may be affixed to said separated pontoons, said rotating winch frame being in turn, adaptable to rotate toward the rear of said vehicle, as said vehicle advances toward the water utilizing said vehicles drive train or braking system and by means of a winch cable disposed to the rear of said vehicle, to lift said vehicle to a position where said rear extendable beam may be affixed to said separated pontoons, said vehicle thus mounted being capable of being launched into water conveyed by retractable wheels attached to said pontoons.

2. The vehicle launching system of claim 1 wherein the said extendable beams attached to the front and rear of the said vehicle may be rotated by means of hydraulic cylinders to facilitate the raising and lowering of the said vehicle.

3. The vehicle launching system of claim 2 wherein the said hydraulically rotated extendable beams may be further extended to permit the extendable beams to rotate vertically to such a degree as to lift the attached said pontoons atop said vehicle when said vehicle is resting on a dock or other solid surface.

4. The vehicle launching system of claim 1 wherein said procedure may be reversed to permit the unloading of said vehicle from said pontoons.

* * * * *